United States Patent
Stevens, III et al.

(10) Patent No.: US 10,951,612 B2
(45) Date of Patent: Mar. 16, 2021

(54) SYSTEM AND METHOD OF INTER-ACCOUNT RESOURCE ACCESS MANAGEMENT

(71) Applicant: Verizon Patent and Licensing Inc., Basking Ridge, NJ (US)

(72) Inventors: Ira C. Stevens, III, New Boston, NH (US); Nicholas H. Katis, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/698,479

(22) Filed: Nov. 27, 2019

(65) Prior Publication Data

US 2020/0099680 A1 Mar. 26, 2020

Related U.S. Application Data

(63) Continuation of application No. 15/640,247, filed on Jun. 30, 2017, now Pat. No. 10,530,771.

(51) Int. Cl.
*H04L 29/06* (2006.01)
*H04W 12/08* (2021.01)
*H04W 12/06* (2021.01)

(52) U.S. Cl.
CPC ......... *H04L 63/0853* (2013.01); *H04W 12/06* (2013.01); *H04W 12/08* (2013.01); *H04W 12/0804* (2019.01); *H04L 63/108* (2013.01)

(58) Field of Classification Search
CPC .. H04L 63/0853; H04L 63/108; H04W 12/06; H04W 12/08
See application file for complete search history.

(56) References Cited

U.S. PATENT DOCUMENTS

| | | | |
|---|---|---|---|
| 8,966,570 B1 * | 2/2015 | Roth | H04L 63/08 726/1 |
| 9,251,360 B2 | 2/2016 | Meyer | |
| 9,264,436 B2 | 2/2016 | Canning | |
| 9,407,628 B2 * | 8/2016 | Sondhi | H04L 63/0853 |
| 9,418,213 B1 | 8/2016 | Roth | |
| 9,450,963 B2 * | 9/2016 | Srinivasan | H04L 63/08 |
| 9,553,860 B2 * | 1/2017 | Meyer | H04L 63/08 |
| 9,613,190 B2 * | 4/2017 | Ford | G06F 21/62 |
| 9,781,122 B1 | 10/2017 | Wilson | |
| 9,813,426 B2 | 11/2017 | Vidhun | |
| 9,819,673 B1 | 11/2017 | Johansson | |
| 9,912,642 B1 | 3/2018 | Eidt | |
| 10,033,702 B2 | 7/2018 | Ford | |
| 10,089,476 B1 | 10/2018 | Roth | |

(Continued)

*Primary Examiner* — Hosuk Song
*Assistant Examiner* — Stephen T Gundry

(57) ABSTRACT

An improved method and system of enabling the owner of an account associated with a resource to allow a second user to gain access to the resource or a particular aspect of the resource is disclosed. Solutions and implementations disclosed provide an easily manageable mechanism for allowing access to a resource, without the need for a complex administrator-based access control system. Instead, a negotiated account to account resource access arrangement is established between the first user's account and the second user's account to share some or all of the actions available to the first user for the resource.

19 Claims, 7 Drawing Sheets

(56) References Cited

U.S. PATENT DOCUMENTS

| | | | |
|---|---|---|---|
| 2013/0086645 A1* | 4/2013 | Srinivasan | H04L 63/0815 726/4 |
| 2014/0047560 A1 | 2/2014 | Meyer | |
| 2014/0189818 A1* | 7/2014 | Meyer | H04L 63/08 726/4 |
| 2014/0245015 A1 | 8/2014 | Velamoor | |
| 2014/0337914 A1 | 11/2014 | Canning | |
| 2015/0082372 A1 | 3/2015 | Kottahachchi | |
| 2015/0082373 A1* | 3/2015 | Kottahachchi | H04L 63/102 726/1 |
| 2015/0082396 A1* | 3/2015 | Theebaprakasam | G06F 21/604 726/5 |
| 2015/0089569 A1 | 3/2015 | Sondhi | |
| 2015/0089570 A1 | 3/2015 | Sondhi | |
| 2015/0089571 A1* | 3/2015 | Srinivasan | H04L 63/0807 726/1 |
| 2015/0089596 A1* | 3/2015 | Sondhi | H04L 63/0807 726/4 |
| 2015/0135300 A1* | 5/2015 | Ford | H04L 63/0281 726/11 |
| 2015/0200953 A1 | 7/2015 | Vidhun | |
| 2015/0304294 A1* | 10/2015 | Roth | G06F 21/62 726/4 |
| 2015/0310188 A1* | 10/2015 | Ford | H04L 63/0428 726/28 |
| 2016/0028737 A1 | 1/2016 | Srinivasan | |
| 2016/0080361 A1 | 3/2016 | Sondhi | |
| 2016/0085978 A1* | 3/2016 | Meyer | H04L 63/0861 726/28 |
| 2016/0112429 A1* | 4/2016 | Sundaresan | H04W 12/08 726/4 |
| 2016/0352753 A1* | 12/2016 | Roth | G06F 21/6218 |
| 2016/0381021 A1* | 12/2016 | Moore | H04L 63/20 726/1 |
| 2017/0019409 A1 | 1/2017 | Shalunov | |
| 2017/0041296 A1 | 2/2017 | Ford | |
| 2017/0063872 A1* | 3/2017 | Matthiesen | H04L 63/20 |
| 2017/0063873 A1* | 3/2017 | Hidden | H04L 63/20 |
| 2017/0064550 A1 | 3/2017 | Sundaresan | |
| 2017/0093872 A1 | 3/2017 | Braksator | |
| 2017/0118222 A1* | 4/2017 | Subramanya | H04L 63/0815 |
| 2017/0126733 A1* | 5/2017 | Mathew | H04L 63/083 |
| 2017/0200170 A1* | 7/2017 | Curry, Jr. | G06Q 30/018 |
| 2017/0322929 A1 | 11/2017 | Hussain | |
| 2017/0329957 A1 | 11/2017 | Vepa | |
| 2017/0331829 A1 | 11/2017 | Lander | |
| 2017/0331832 A1 | 11/2017 | Lander | |
| 2018/0041467 A1 | 2/2018 | Vats | |
| 2018/0048640 A1 | 2/2018 | Johansson | |
| 2018/0063143 A1 | 3/2018 | Wilson | |
| 2018/0063157 A1 | 3/2018 | Vidhun | |
| 2018/0091516 A1 | 3/2018 | Nixon | |
| 2018/0183802 A1 | 6/2018 | Choyi | |
| 2018/0234428 A1 | 8/2018 | Braksator | |
| 2018/0278614 A1 | 9/2018 | Miller | |
| 2018/0316676 A1 | 11/2018 | Gilpin | |
| 2018/0367506 A1 | 12/2018 | Ford | |

* cited by examiner

SYSTEM AND METHOD OF INTER-ACCOUNT RESOURCE ACCESS MANAGEMENT

CROSS-REFERENCES TO RELATED APPLICATIONS

This application is a continuation of U.S. application Ser. No. 15/640,247, entitled "SYSTEM AND METHOD OF INTER-ACCOUNT RESOURCE ACCESS MANAGEMENT", filed on Jun. 30, 2017, the entirety of which is incorporated by reference herein.

BACKGROUND

It has become increasingly common for individual and business consumers to receive access to various resources (e.g., devices, services, and/or data) through client-based account systems. In order to access the resource, these account systems generally provide an authentication procedure which involves authenticating the user's account and determining that the user has the right to access the desired resource before they gain access. This often means that each user must have the right to access a particular resource, and that is generally obtained by the user purchasing the right. However, there are many instances in which an authorized user of a resource needs to allow a second user to access that resource, even if the second user does not have the right to access. For example, a user may desire to share a resource with a friend or may need to delegate some responsibility of managing a resource with a colleague or employee.

In such cases, the user may desire to provide full access to the second user, or may need to restrict the second user's access according to a specific role or policy. One way this is done is by utilizing an access control system which includes an administrator that manages user accounts. The administrator may restrict access to each account by assigning roles (i.e., role-based access control) or policies (i.e., attribute-based access control) that grant or deny functions and visibility to each specific user account. This means of access control may be useful for business customers and large accounts, but makes little sense to an individual user due to its complexity. For example, it is not practical for an individual consumer who simply wishes to share access to one of their devices with a friend to employ a complex access control system.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the disclosed subject matter. It will be apparent to persons of ordinary skill, upon reading this description, that various aspects can be practiced without such details.

Consumers increasingly are being provided with mechanisms to configure, control, and/or use various local or remote devices, and to receive particular services remotely. Generally, access is provided to such devices or services through the use of an account. Each account is usually set up and provided authorization to access a specific device or service. The specific device or service may be referred to as a resource. Often, the owner of an account may need to delegate some of the responsibility of managing and/or utilizing the resource to a second user. Traditional methods of allowing additional users' access to resources associated with an account are generally too complex and inefficient for individual users to employ.

In the present implementations, various techniques are used to implement a user-friendly and cost effect mechanism for enabling the owner of an account associated with a resource to allow a second user access to the resource. This is done, in one implementation, without the need for an administrator managing users, access-control roles or access-control policies. Instead, a negotiated resource access arrangement is established between the owner's account and the second user's account to delegate some or all the actions available to the owner for the resource.

Figure 1:
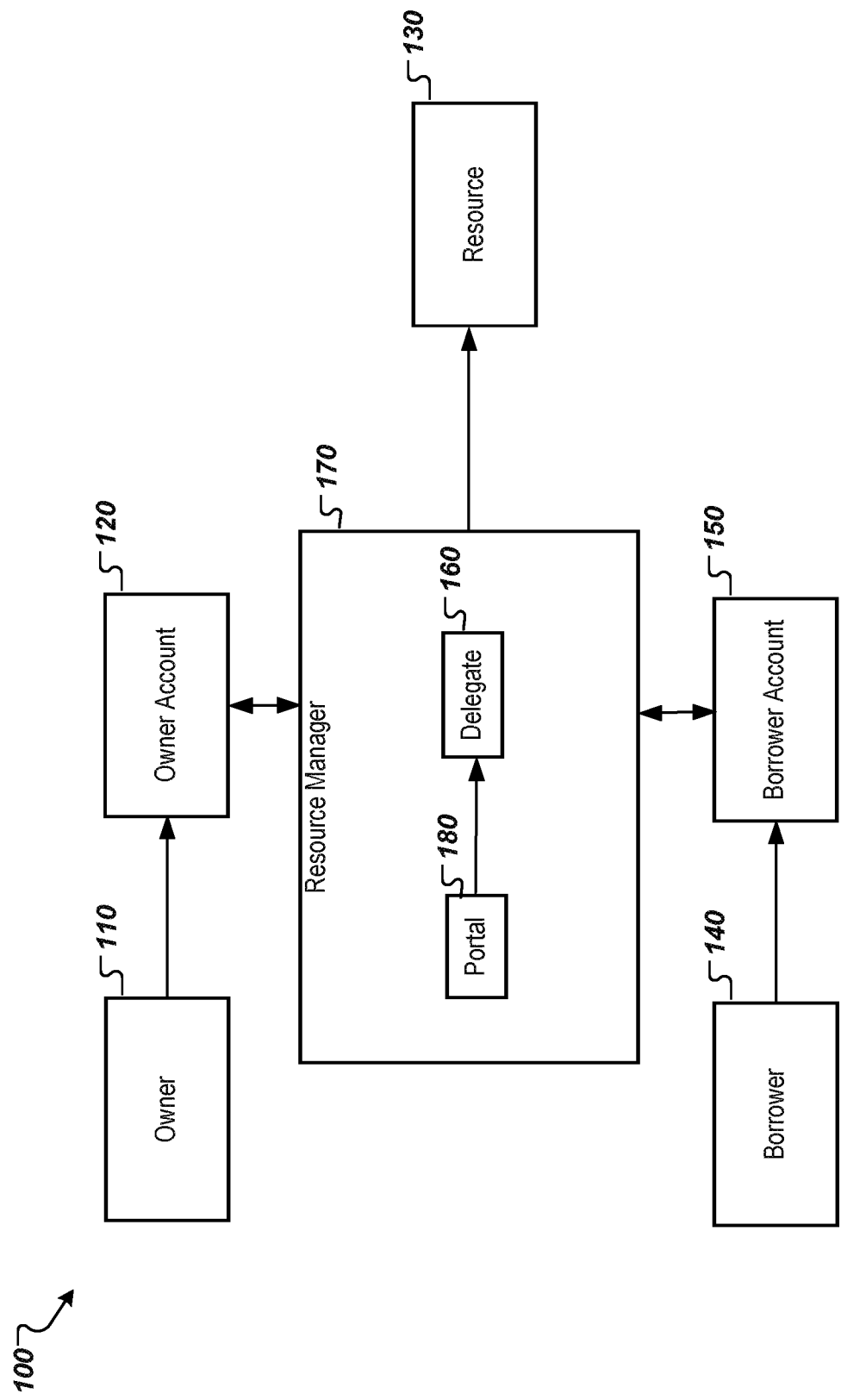
FIG. 1 illustrates a functional block diagram of one implementation of an environment providing a mechanism for account to account resource access management, according to one or more aspects of this disclosure.

Referring now to the drawings, FIG. 1 illustrates a functional block diagram of one implementation of an environment that provides a mechanism for enabling an owner to delegate access to a resource, in accordance with one or more aspects of the present application. Environment 100 includes, among other features, an owner 110, which, in one implementation, is in an individual user who has gained authorization to access a certain resource. For example, the owner may be an individual who has purchased a device, or the rights to use a software program or an application. The owner could also be a business entity which has similarly purchased the rights to use a program or service or to utilize one or more devices.

In one implementation, the owner 110 is associated with an owner account 120 which allows the owner 110 to use the resource. The owner account 120 is generally created before the owner's first access to the resource and in one implementation, includes data that identifies the owner, their rights to the resource, and a method of authentication. For example, the owner account 120 may include a user name and password, which in one implementation, are selected by the owner 110, and can be utilized to log into an application that provides access to the resource. Many other methods of verification of identify and authorization are known in the art. The owner account 120 may utilize any authentication method available to verify the owner 110's identity. In one implementation, verification is performed by a resource manager 170. In one implementation, the resource manager is also responsible for storing user account information and acting as an intermediary between users and resources.

Once the owner 110's identity and their right to access have been verified, the owner is provided access to a resource 130. The resource 130 can be one or more devices, applications, data or any combination of those. For example, the resource 130 can be a home security system that includes electronic door locks, remote access to light fixtures, thermostats, and other electronic devices inside the house, remote access to cameras, and/or one or more applications that allow the owner 110 to remotely operate the devices. As an example, an application may allow the owner 110 to operate a front-door lock. Another application may provide images or videos captured by the cameras and may enable the owner 110 to move the cameras to see a different angle of the house or zoom in or out on an object. The same application or a different one may allow the owner 110 to turn on and off certain light fixtures or appliances inside the house. By the utilizing the method and system of environment 100, the owner 110 can allow a second user to access one or more of such applications and devices, thereby providing them access to operate certain devices associated with the home security system. For example, the owner 110 may provide access to the front-door lock to their baby-sitter via an application that operates the front-door-lock. The access may be unlimited or may include a time limit. For example, access may only be allowed during specific times of the day and days of the week for which the baby-sitter is scheduled to work.

Another example resource may be smart city lights that can be operated remotely. For example, the color and intensity of each light may be changed remotely, each light may be tested to determine if it is operating properly, and a time at which each light turns on and off may be changed. A city which has purchased and installed such smart lights from a vendor may designate a specific vendor for managing the lights. The vendor may dedicate a team for managing the lights. In such a case, the head of the department may have the master owner account and he/she may desire to grant each of their team members some specific access to all or certain number of the lights. Numerous other examples of resources are considered.

There are many situations in which, the owner 110 may desire to share all or part of their access rights to the resource 130 with a second user outside of their account. The second user is referred to as the borrower 140 in environment 100. The borrower 140 may be an individual or an entity. In general, to receive access to the resource 130, the borrower 140 may need to establish their own account 150 if they have not created one previously. In one implementation, this account is referred to as a Borrower account 150. In one implementation, the borrower account 150 is similar to the owner account 120 in that it provides a mechanism for identifying and subsequently authenticating the borrower 140 before the borrower 140 can access the resource 130. The borrower account 150 is generally created before the borrower's first access to the resource 130 and, in one implementation, includes data that identifies the borrower and a method of authentication. For example, the borrower account 150 may include a user name and password, which in one implementation are selected by the borrower 140. The borrower account 150, however, is different from the owner account 120 in that the borrower account is considered a foreign account. In other words, the borrower account 150 does not have authorization to directly access the resource 130. Access is generally only provided to the borrower account 150 through permission from the owner 110.

In one implementation, once the borrower account 150 is established, the owner 110 can give access to one or more aspects of the resource 130 to the borrower 140 by simply inviting them through an intermediate mechanism referred to as a delegate 160. The delegate 160 is a negotiated resource access arrangement established between the owner account 120 and the borrower account 150.

In one implementation, the owner 110 sends a request for providing access to the resource to the resource manager 170, which, in response creates the delegate 160 for the specific relationship between the owner's account and the borrower's account. Once the delegate 160 is created, it invites the borrower 120 to access the resource 130. In one implementation, the Portal 180 is a user-friendly tool which provides means for the user to access the resource 130. This includes guiding the users through the process of requesting access for a second user and/or accepting the invitation to use the delegate 160. The portal 180 and the delegate 160 are, in one implementation, part of the resource management 170, which provides management of resources associated with a particular account (i.e., owner account) or a sub-account without burdening the owner 110 with unnecessary and complicated user, user-role or policy setup and maintenance.

In one implementation, the resource manager 170 provides a mechanism for allowing specific actions to be taken on a resource by the borrower 140. These actions include, in one implementation, reading, operating, updating, creating and/or even deleting. Each action may be allowed or prohibited by the owner 110 based on their needs. Moreover, the owner 110 may restrict the borrower 140's access to the resource 130 to a specific schedule. For example, the owner 110 may specify that the borrower 140 can only access the resource 130 during specific hours of the day.

To allow specifying the types of actions available and/or time limitations placed on the borrower, in one implementation, the delegate 160 includes one or more attributes. These include, in one implementation, a schedule, target, condition, and/or scope. These attributes and their related information are illustrated in Table 1 below.

TABLE 1

| Name | Type | Format | Description |
| --- | --- | --- | --- |
| schedule | string | uuid | This is an optional delegate access schedule. |
| target | array | uuid | An optional resource target restriction. If included, the borrower cannot operate on resources not listed here. |
| condition | string | predicate | An optional predicate that can restrict access by user, request or target resource attribute values. |
| scope | array | string | The scope permitted for the delegate. |

In one implementation, a schedule is an attribute that can indicate a time period during which access should be granted to the borrower 140 through the delegate 160. For example, for a front-door lock resource, the schedule may indicate that access is only granted from 8 am-5 pm, on Monday through Friday. In one implementation, the schedule is set up when the delegate 160 is first created. Alternatively, the schedule may be set up and/or modified after the delegate 160 is created. For example, if an employee's work schedule changes after access to a front-door lock is granted to them, the owner 110 may modify the schedule attribute of the delegate 160 to reflect the employee's new work schedule. In one implementation, the schedule is referenced using an opaque identifier, that is, a string data-type which is formatted as a universally unique identifier (UUID) and the schedule itself is held as an independent resource.

In one implementation, the target attribute is an optional tool for specifying which resources a delegate can access. This may be used when the owner has access to multiple resources through their owner account and desires to grant access to one or more of those resources (but not all) to the borrower. This is done, in one implementation, by including all the resources that the borrower has access to in the target list. This means, that if a target list is included for the delegate, the borrower can only access those resources that are listed there. In one implementation, if the delegate with a target list is allowed to create resources, any new resource created by the borrower is automatically added to the target list, thus enabling the borrower to access that resource. The target attribute is, in one implementation, an array of opaque identifiers referencing each independent resource, where each identifier is a UUID formatted data-type.

The delegate may also include a condition attribute which, in one implementation, is an optional predicate that can be used to restrict access of the delegate. In one implementation, the condition can restrict access by user, request or target resource attribute values. For example, a condition can be set in place to restrict access of the delegate to certain resources. As another example, some users that have additional rights (i.e., power users) may restrict access by using a predicate against other resources held by the owner's account, the borrower user resource, or the request itself (including the body of the request or the target resource being acted upon). In this manner, the owner could can restrict the delegate to only allow a specific user on the borrower account. In one implementation, the condition attribute, is a string data-type and is formatted as a condition grammar-or, a domain specific language grammar.

In one implementation, the delegate may also include a scope attribute which can be used to define actions that the borrower is permitted to take with respect to the resource. For example, the scope may indicate that the delegate is only given read permission with respect to the resource. Alternatively, the scope may indicate read-write capabilities. In one implementation, the scope may specify that the delegate has read-only permission with respect to one resource and read-write permissions with respect to another resource. In one implementation, the scope attribute can also be used to grant permission to the borrower to create resources. In another implementation, the scope definitions may be used to prevent a borrower from accessing various aspects of another resource or another attribute. Thus, the scope definitions can be used to define the type of access (e.g., read-write or read-only) available to the delegate for each resource (e.g., device #1) or each attribute. This is illustrated in Table 2.

TABLE 2

| Resource and/or Attribute | Read-Write | Read-Only |
|---|---|---|
| Device #1 | ts.device | ts.device.ro |
| Place | ts.place | ts.place.ro |
| Schedule | ts.schedule | ts.schedule.ro |
| Tag | ts.tag | ts.tag.ro |
| Target | ts.target | ts.target.ro |
| Trigger | ts.trigger | ts.trigger.ro |

In one implementation, the attributes for which a scope can be defined include place, schedule, tag, target, and trigger. Other attributes for which a scope can be defined are also possible. The place attribute may define a geographical area within which a certain type of access is permissible. For example, the place attribute may be used to restrict the borrower's ability to unlock the front-door unless they are within a specific geographical area of the front-door. This can be used to prevent the borrower from accidently or purposely opening the door when they are not within the vicinity of the house. In another example, the borrower may have access to view the thermostat of a house (i.e., read-only access) if they are outside the house, but be provided access to both view the thermostat and change the temperature when they are inside the house. In one implementation, the scope pattern ts.[resource-name] (or attribute) is used to indicate read-write access for a resource and ts.[resource-name].ro is used to specify read-only access for the resource.

As discussed above, the schedule attribute may indicate a time period during which access is permissible. By defining a scope for the schedule attribute, different types of access may be granted during different time periods. For example, the delegate may be granted full access to a device resource during business hours and read-only access after-hours.

The tag attribute, in one implementation, is a label on a resource. This means, for example, that the tag may be a resource that is configured to label other resources in order to allow the user to create groups, logical entities and/or an acyclic graph for the resource(s).

In one implementation, the target attribute is a notification or alert for a destination. The destination can be a program or application that is configured to provide a notification or alert. For example, the destination may be an email application, text messaging application, cloud messaging application, push notification application or a RESTful endpoint.

In one implementation, the trigger attribute is a triggering event or condition for which a notification or alert is created. For example, for a home security system, the condition may be the front door getting locked. In such a case, a notification is created once the system recognizes that the front door was locked. As another example, a notification may be set up for the condition of the temperature going above a certain degree.

In one implementation, in addition to the read-only and read-write scope definitions, other scope definitions such as write and write-only are also contemplated. Write may be used for making changes to a resource, while write-only may be utilized for creating a new resource. For example, by receiving write access to a resource, the borrower may be able to modify the resource through the delegate. Write-only access then enables the borrower to create new resources (i.e., create new programs or add new devices) in the system.

In one implementation, the scope definitions may have further specific allowable operations defined for them and/or restrictions placed on them. This is done, in one implementation, by adding a verb, which defines the restriction and/or allowable operation, using a comma delimited list after a post-fixed '#'. Some examples of this are illustrated in Table 3.

TABLE 3

| Scope Modifier | Example | Description |
| --- | --- | --- |
| post | ts.device#post | Allow any write-oriented post-based operation, e.g., creation or action. |
| put | ts.device#put | Allow put-based operations. |
| patch | ts.device#patch | Allow patch-based operations. |
| delete | ts.device#delete | Allow delete. |
| actions/{action} | ts.device#actions/[defined-action] | Allow only those actions listed. |

In one implementation, the allowable operation is referred to as a scope modifier, which includes post, put, patch, delete, and/or any other specifically defined action. In one implementation, these scope modifiers are used for write and write-only scope definitions. The post operation may refer to any allowable write-related post-based operation. This includes, in one implementation, creating a new resource and modifying one or more existing ones. A put operation may refer to a write operation which requires all attributes (changed or not) of the resource to be stored by the resource manager. A patch operation is also a write operation similar to a PUT operation. However, a patch operation does not require all of the attributes of the resource to be included, but only those that have changed. The delete operation allows the borrower to delete one or more portions of a resource, and/or an entire resource. In one implementation, the delete operation is only allowed if it is specifically included as a scope modifier for the delegate. Scope modifier may be used to define any other desirable actions beyond create, read, update, and delete. For example, one action can be setting a device actuator value (e.g., "open the door"). Another example may be provisioning (i.e., activating) a device. In yet another example, the device field "get" command may be defined as an action. This is indicated, in one implementation, by including the following command: ts.device#actions/get.

Figure 2:
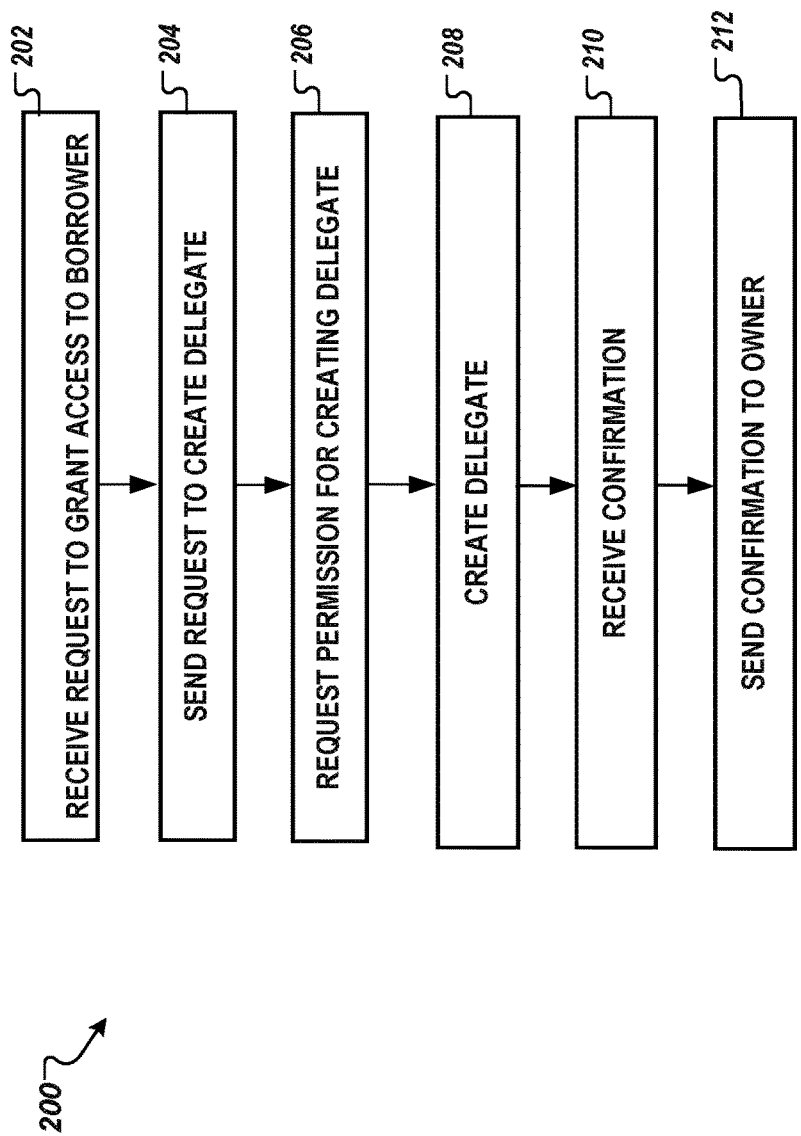
FIG. 2 illustrates one diagram of a flow of example operations for initiating an account to account resource access arrangement, according to one or more aspects of this disclosure.

Referring to the drawings, FIG. 2 illustrates a flow diagram depicting an example operation 200 for initiating an account to account resource access arrangement between an owner and a borrower, according to one or more aspects of this disclosure. In one implementation, operation 200 begins at 202 by receiving a request to grant access to a specific resource to a borrower. In one implementation, the request is received by an application which is used to establish the account to account access sharing relationship. The application may be a program designed specifically to set up and maintain the account to account resource access arrangement. Alternatively, the application may be included as part of the resource. In yet another alternative, the set up and maintenance of the account to account resource access arrangement may be handled by the program originally responsible for managing authentication and access to the resource.

In one implementation, the request is received directly from the owner to the application, for example, through a graphical user interface of the application. As an example, the application may offer an option for the owner to indicate a desire to share access to one or more resources with a second user by selecting the option. In such a configuration, by allowing the owner to select a button (or any other similar graphical user interface feature) that indicates a request to share access to the resource with another user, the system enables the owner to send a direct request for allowing access to the other user. Alternatively, the request is received through an intermediary medium. In one implementation, the request includes some information by which the borrower can be identified and/or contacted. For example, the request may include an email address and/or phone number for the borrower.

Once the request to share access is received, the operation 200 sends a request to create a delegate, at 204. In one implementation, the request to create a delegate is sent from the application to the resource manager. Once the request to create a delegate is received, in one implementation, standard intra-account access control mechanisms are applied. These may include checking for permission, in at least one implementation, to determine that the owner has permission to grant access to a borrower. The operation 200, then, moves to step 208 to create the delegate. This is done, in one implementation, by the application. Once the delegate is created, confirmation is received by the application, at 210, that the delegate was successfully created. The application then notifies the owner, at 212, that access is granted to the borrower. Notification can be made by presenting a notice to the owner on a user interface of one or more devices of the owner. For example, a notice may be presented on the user interface of the device with which the owner made the original request to provide access to the borrower. In one implementation, the application used to make the request presents the notice to the owner that access was granted. Alternatively, the notice is sent to the owner through one or more other means of communication. For example, an email message may be sent to the owner or a text message may be sent to his phone number.

At this stage, permission has been granted to provide the borrower with access to the resource and a delegate has been created, but direct means of access to the resource are yet to be established. To achieve that, the borrower would first need to accept the account to account access relationship.

Figure 3:
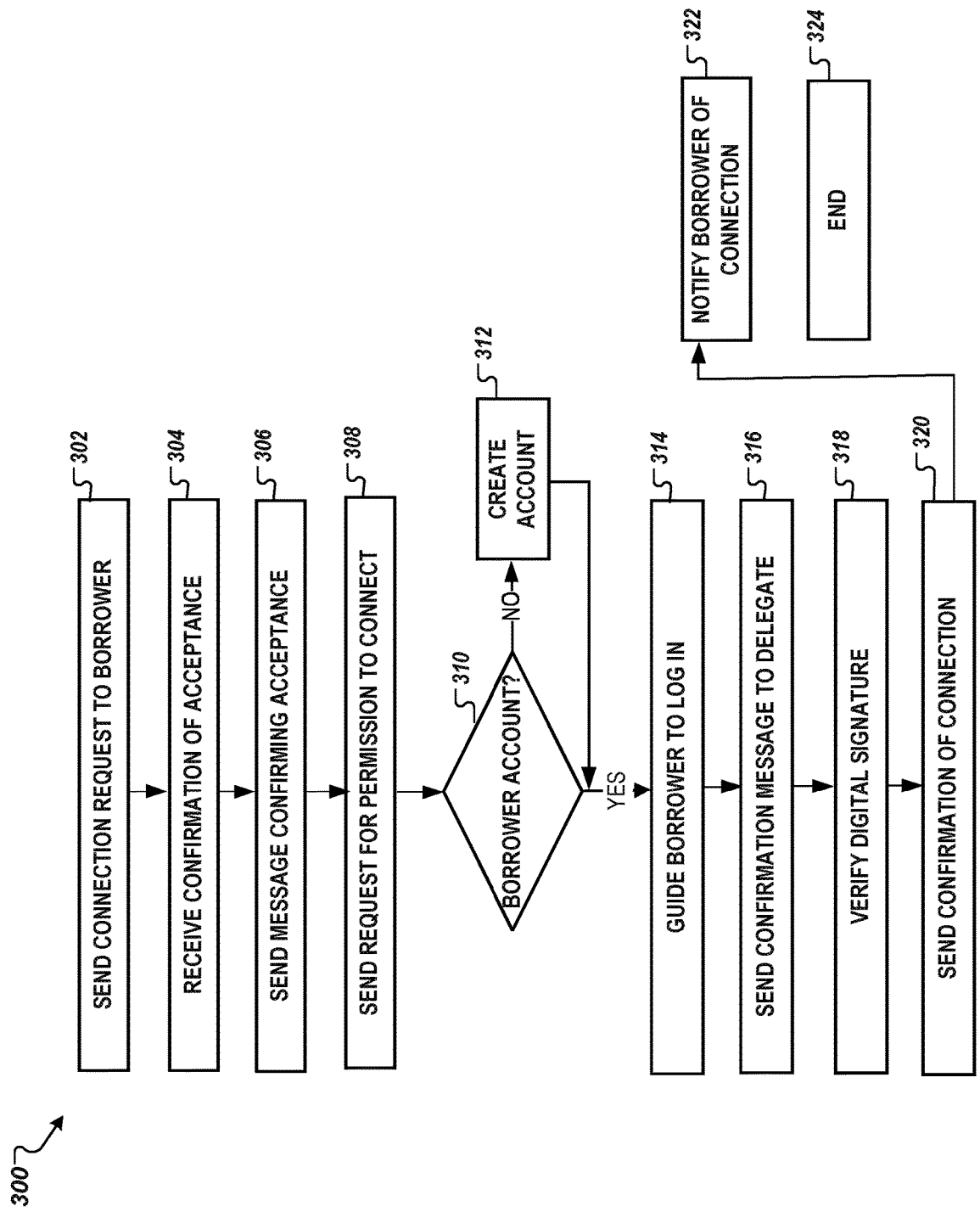
FIG. 3 illustrates one diagram of a flow of example operations for accepting an account to account resource arrangement, according to one or more aspects of this disclosure.

FIG. 3 illustrates a flow diagram depicting an example operation 300 for accepting the delegate relationship by the borrower, according to one or more aspects of this disclosure. In one implementation, operation 300 begins at 302 by sending a connection request to the borrower. This is done, in one implementation, by the delegate sending a message to the borrower. For example, the delegate may send a message to the borrower by sending an email to the email address provided by the owner as part of the owner's request (step 202 of FIG. 2). In one implementation, the email contains information about the resource, the owner who is sharing the resource with the borrower, and/or a link for accepting the connection to the resource. Alternatively, the connection request message may be sent via other means of communication. For example, a text message with a link may be sent to the borrower's mobile device. As another example, a pop-up message with a button to press to confirm acceptance may appear on a user interface of the borrower's telecommunication device. The pop-up message may be presented by an application on the borrower's device. The application may be the same as the type of application used by the owner to send the original access request or it may be a different application.

Once the borrower receives and views the message, they can click on the link included in the message to indicate their acceptance of the account to account access relationship. Other alternatives for accepting the connection are also possible. For example, the borrower may press a button presented to him/her on a screen. In one implementation, clicking on the link (or the button) sends a confirmation massage to the portal that the connection was accepted. Thus, at 304, the operation 300 receives a confirmation message that the borrower has accepted the relationship. Once the confirmation message has been received, operation 300 determines, at 310, if the borrower has an account. If it is determined, at 310, that the borrower does not yet have an account, then at 312, operation 300 proceeds to create an account for the borrower. This is done, in one implementation, by sending a message to the borrower that notifies them of the need to create an account and guides them to a webpage or an application that provides instructions and/or procedures for creating the account. The account may be established via the application that manages the resource or an application that manages the account to account access relationship. In one implementation, the application is the one used to communicate directly with the resource manager.

Once the account is created or it is determined that an account already exists, operation 300 proceeds to guide the borrower to log in to their account, at 314. This is done, in one embodiment, by the portal. After the borrower has successfully logged in, Operation 300 sends a confirmation message to the delegate, at 316. In one implementation, this confirmation message includes a digital signature that is used to verify the originating delegate server's identity. Thus, at 318, operation 300 verifies that the digital signature includes the same key as the one obtained by the owner. This is done, in one implementation, by the delegate, as the delegate is also the unit that sends the connection request message to the borrower. In one implementation, the link included in the connection request message to the borrower includes the digital signature, and verification includes authenticating that the digital signature contains the same key as was originally sent by the delegate to the borrower.

Once the digital signature is verified, operation 300 proceeds, at 320, to send a message to the portal that the delegate is now connected to the borrower. Subsequently, operation 300 sends a connection confirmation message to the borrower, at 322, informing them that they are now connected to the resource. In one implementation, this confirmation message is sent from the portal and includes instructions for gaining access to the resource. Operation 300 then proceeds to end, at 324.

Figure 4:
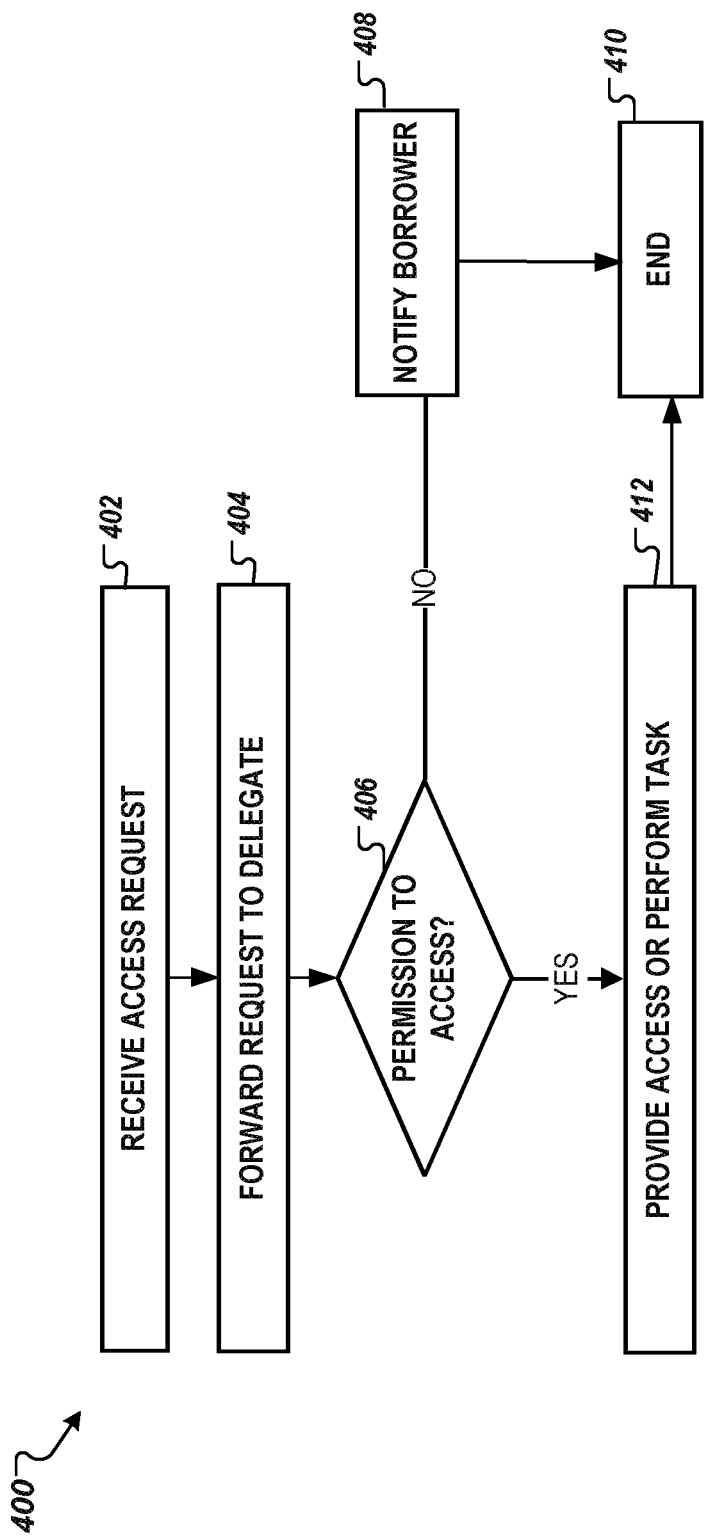
FIG. 4 illustrates one diagram of a flow of example operations for using an account to account resource access arrangement to access a resource, according to various aspects of this disclosure.

FIG. 4 illustrates a flow diagram depicting an example operation 400 for accessing and using the resource by the borrower once account to account access has been established, according to one or more aspects of this disclosure. In one implementation, operation 400 begins at 402 by receiving a request from the borrower to access the resource and/or perform a task. For example, for a home-security system, this may involve receiving a request to turn on a specific light in the house. The request is received, in one implementation, through an application associated with the resource and used by the borrower. In one implementation, this is done, by the borrower clicking on a link provided in step 324 of FIG. 3. Alternatively, the borrower may simply log in to the application with their account and receive access, as the delegate has already been created and their connection to the delegate is established and confirmed. Once the request to access the resource or perform a task on the resource has been received, in one implementation, standard intra-account access control mechanisms are applied to authenticate the borrower and/or determine that the borrower has permission to access the resource.

The request to access the resource and/or perform the task is forwarded to the delegate, at 404. Upon receiving the request, operation 400 proceeds to determine if the borrower has permission to perform the specific task requested and/or access the requested resource, at 406. This is done, in one implementation, because there may be multiple resources to which a borrower has access or a plurality of tasks that may be performed with respect to a single resource, and not all the resources may be accessible at all times and/or not all tasks may be permissible on any given resource. For example, the owner may have specified a schedule of time outside of which the borrower is not allowed to access the resource. Thus, the scope definitions discussed above are checked at this stage. If it is determined that the borrower does not have permission to access the resource or perform the requested task, operation 400 moves to 408 to notify the borrower and proceed to end, at 410. The notification involves, in one implementation, sending a message to the application indicating that permission is not granted and subsequently presenting a notification to the borrower on a graphical user interface associated with the application that they do not have permission. This may involve showing a message on a screen of the device the borrower used to request access. Alternatively, a message could be sent to the borrower to one or more of their electronic accounts on any of their electronic devices. For example, an email message could be sent to their email address or a text message could be sent to one or more applications of their mobile device.

When it is determined, at 406, that the borrower has permission to access the resource and/or perform the requested task, operation 400 proceeds to instruct the resource to perform the requested task and/or allow access to the resource, at 412. This is done, in one implementation, by creating a direct connection between the delegate and the resource. After performing the operation or granting access to the resource, operation 400 proceeds to end, at 410.

In one implementation, the same or similar procedure as the steps of operation 400 may be performed every time the borrower attempts to perform a task on the resource or access it. Alternatively, once connection to the delegate has been established, the operation may allow the borrower to perform tasks and/or access the same resource without having to request permission for accessing the delegate each time. In other words, once a link to the delegate has been established, the borrower can continue using the link until it is terminated.

Figure 5:
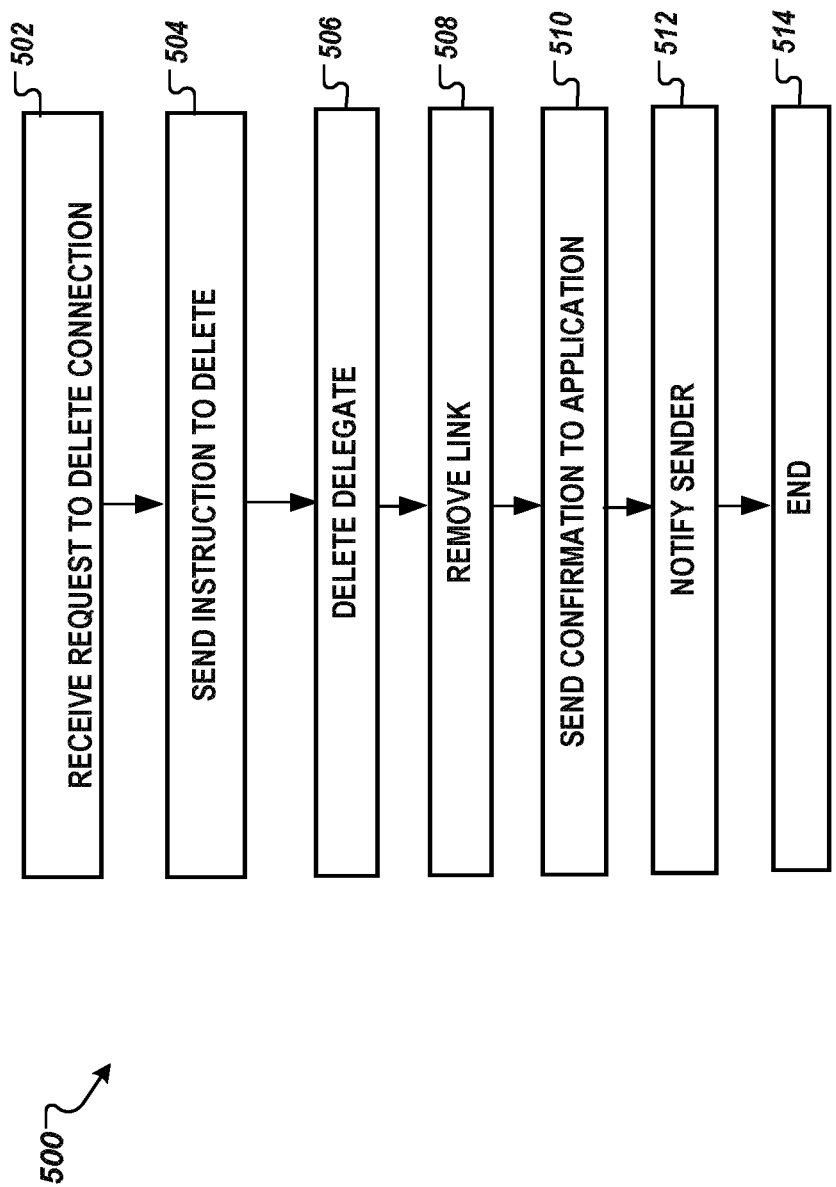
FIG. 5 illustrates one diagram of a flow of example operations for terminating an account to account resource access arrangement, according to various aspects of this disclosure.

FIG. 5 illustrates a flow diagram depicting an example operation 500 for terminating an account to account access relationship between an owner and a borrower, according to one or more aspects of this disclosure. In one implementation, operations 500 begins at 502 by receiving a request to delete the connection. The request may originate from either the owner or the borrower, and is, in one implementation, received via the application. In one implementation, the application provides a mechanism for the owner or the borrower to request termination. For example, the application may provide an option (e.g., a button) to select to terminate access. Once a request to delete the connection has been received, an instruction to delete is issued and sent from the application, at 504. In one implementation, standard authentication procedures are performed at this stage to ensure the user has permission to delete.

At this stage, operation 500 proceeds to step 506 to delete the delegate. Once the delegate is deleted, the link between the delegate and the source is removed, at 508. Subsequently, a confirmation message is sent to the application that the delegate was deleted and the connection removed, at 510. A message is then sent and/or presented to the sender of the request that the relationship was successfully terminated, at 512. In one implementation, a message is also sent to the other party involved in the relationship (e.g., if the owner requested deleting the connection, the borrower will also be notified). Operation 500 then proceeds to end, at 514.

Accordingly, operations 200, 300, 400 and 500 can be used to establish, accept, use and terminate a link between an owner account and a borrower account, whereby a borrower can gain access to and/or make changes to a resource available to the owner. Using the example of the front-door lock resource, this means, in one implementation, the owner can simply invite their baby-sitter via an application to have access to their front-door lock. The application will then send an email to the baby-sitter with a link allowing them to accept the invite from the owner. Once the baby-sitter clicks on the link, they would be guided through account creation (if they did not already have an account) and automatically linked to the owner's front-door-lock control. The baby-sitter can then continually access the front-door lock control system, contingent upon any restrictions placed on their access by the owner, until the access is terminated. Either the baby-sitter or the owner can terminate access at any time by simply submitting a request.

Figure 6:
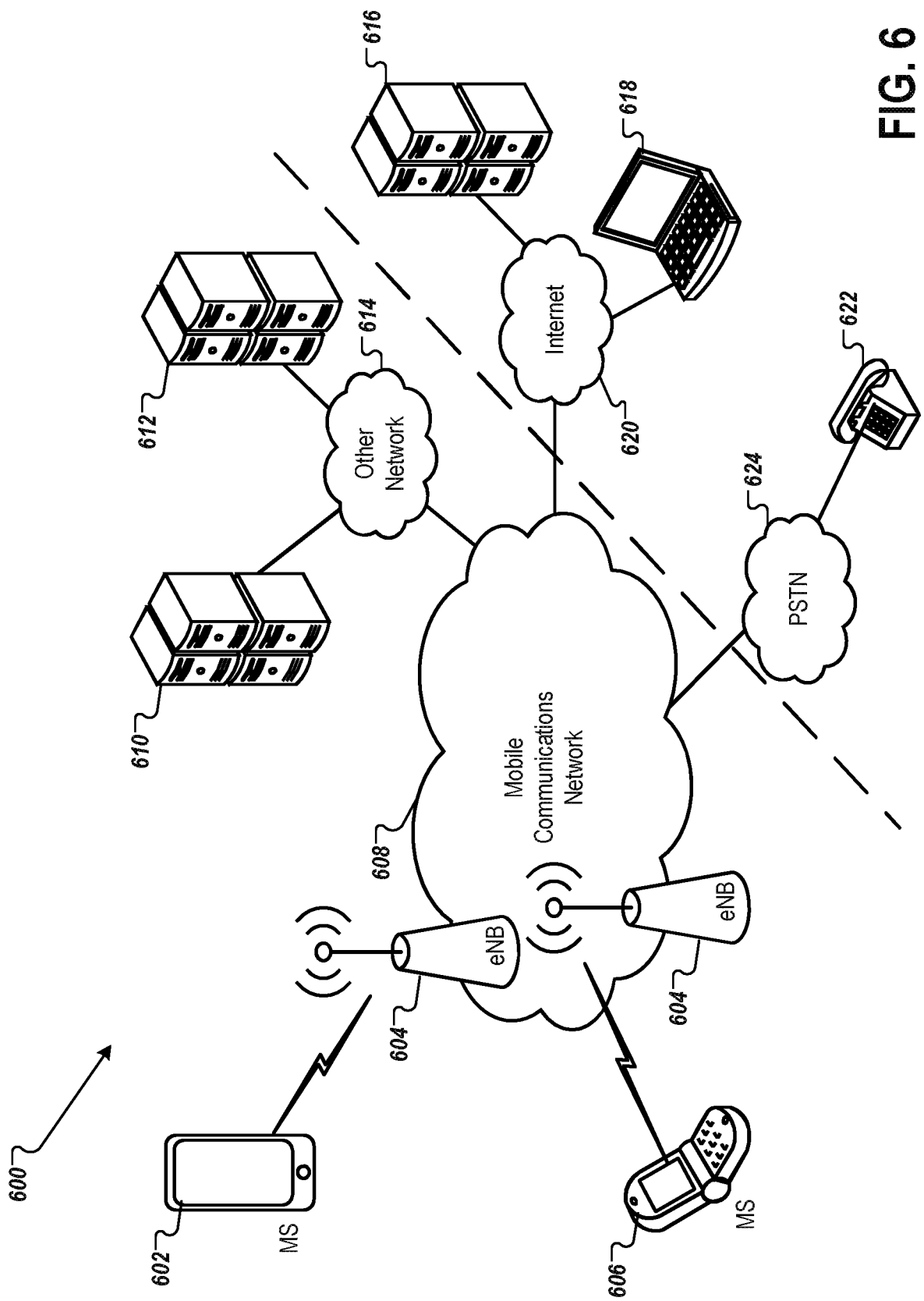
FIG. 6 a high-level functional block diagram of an example system of networks/devices that provide various communications for mobile stations that can be used to initiate, accept, use and/or terminate an account to account resource access configuration, according to various aspects of this disclosure.

In one implementation, the methods and system discussed in this disclosure for providing account to account resource access management are used in Internet of Things (IoT) devices. FIG. 6 illustrates an example system 600 offering a variety of mobile communication services in a mobile network where IoT devices may utilize account to account resource access management. The example of FIG. 6 shows two mobile stations (MSs) 602, 606, which may include IoT devices, as well as a mobile communication network 608. Mobile stations 602, 606 may also be interpreted as mobile devices or user equipment (UE). Each mobile station may be configured and used by a different user to access a resource. For example, mobile station 602 may be used by the owner, while the mobile station 606 is used by the borrower. Mobile stations 602 and 606 may be used for setting up, accepting, using and/or terminating a delegate relationship. The network 608 provides mobile wireless communications services to those stations as well as to other mobile stations (not shown), for example, via a number of base stations (BS) 604. The present techniques may be implemented in or used in any of a variety of available mobile networks 608, and the drawing shows only a very simplified example of a few relevant elements of the network 608 for purposes of discussion here.

The wireless mobile communication network 608 might be implemented as a network conforming to the LTE standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 602, 606 may be capable of voice telephone communications through the network 608. Additionally, the mobile stations 602, 606 may be capable of data communications through the particular type of network 608 (and the users thereof typically will have subscribed to data service through the network). In one implementation, it is through this data communication that they can gain access to and/or modify a resource.

The wireless mobile communications network 608 allows users of the mobile stations such as 602, 606 (and other mobile stations not shown) to initiate and receive telephone calls to each other as well as through the public switched telephone network or "PSTN" 624 and telephone stations 622 connected to the PSTN. The network 608 typically offers a variety of data services via the Internet 620, such as accessing one or more resources, downloads, web browsing, email, etc. By way of example, the drawing shows a laptop PC type user terminal 618 as well as a server 616 connected to the Internet 620; and the data services for the mobile stations 602, 606 via the Internet 620 may be with devices like those shown at 616 and 618 as well as with a variety of other types of devices or systems capable of data communications through various interconnected networks. Each of the devices 616 and 618 may be considered a resource to which the mobile stations 602 and 606 have access through the internet. A resource could also be an application that is stored on one of the devices 616 or 618.

Mobile stations 602, 606 can take the form of portable handsets, smart-phones or personal digital assistants, although they may be implemented in other form factors. Program applications that are used to access a resource and/or are part of the resource can be configured to execute on many different types of mobile stations 602, 606. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 600 can be implemented by a number of interconnected networks. Hence, the overall network 600 may include a number of radio access networks (RANs), as well as regional ground networks interconnecting a number of RANs and a wide area network (WAN) interconnecting the regional ground networks to core network elements. A regional portion of the network 600, such as that serving mobile stations 602, 606, can include one or more RANs and a regional circuit and/or packet switched network and associated signaling network facilities.

Physical elements of a RAN operated by one of the mobile service providers or carriers, include a number of base stations represented in the example by the base stations (BSs) 604. Although not separately shown, such a base station 604 can include a base transceiver system (BTS), which can communicate via an antennae system at the site of base station and over the airlink with one or more of the mobile stations 602, 606, when the mobile stations are within range. Base stations 604 may include eNodeBs in a LTE mobile network. Each base station can include a BTS coupled to several antennae mounted on a radio tower within a coverage area often referred to as a "cell." The BTS is the part of the radio network that sends and receives RF signals to/from the mobile stations 602, 606 that are served by the base station 604.

The radio access networks can also include a traffic network represented generally by the cloud at 608, which carries the user communications and data for the mobile stations 602, 606 between the base stations 604 and other elements with or through which the mobile stations communicate. The network can also include other elements that support functionality other than device-to-device media transfer services such as messaging service messages and voice communications. Specific elements of the network 608 for carrying the voice and data traffic and for controlling various aspects of calls, data transfers, or sessions through the network 608 are omitted here for simplicity. It will be understood that the various network elements can communicate with each other and other aspects of the mobile communications network 600 and other networks (e.g., the public switched telephone network (PSTN) and the Internet) either directly or indirectly.

The carrier will also operate a number of systems that provide ancillary functions in support of the communications services and/or application services provided through the network 600, and those elements communicate with other nodes or elements of the network 600 via one or more private IP type packet data networks 614 (sometimes referred to as an Intranet), i.e., private networks. Generally, such systems are part of or connected for communication via the private network 614. A person skilled in the art, however, would recognize that systems outside of the private network could serve the same functions as well. Examples of such systems, in this case operated by the network service provider as part of the overall network 600, which communicate through the intranet type network 614, include one or more application servers 610 and a related authentication server 612 for the application service of server 610. As illustrated in FIG. 6, the servers 616 and 610 may communicate with one another over one or more networks. In one implementation, the authentication server 612 stores user account information such as owner and borrower accounts. Moreover, the application server 616 performs, in one configuration, the functions of the resource manager.

A mobile station 602 or 606 communicates over the air with a base station 604. The mobile station 602 or 606 communicates through the traffic network 608 for various voice and data communications, e.g. through the Internet 620 with a server 616 and/or with application servers 610. Services offered by the mobile service carrier which can be shared with a second user may be hosted on a carrier operated application server 610, for communication via the networks 608 and 614. Servers such as 616 and 610 may provide any of a variety of application or service functions in support of or in addition to an application program running on the mobile station 602, 606. For a given service, an application program within the mobile station may be considered as the owner and the programming at 616 or 610 may be considered as the 'server' application for the particular service.

To ensure that the application service offered by server 610 is available to only authorized devices/users, the provider of the application service may also deploy an authentication server 612. The authentication server 612 could be a separate physical server as shown, or authentication server 612 could be implemented as another program module running on the same hardware platform as the server application 612. Essentially, when the server application (server 612 in our example) receives an access request from an owner or borrower application on a mobile station 602, 606, the server application provides appropriate information to the authentication server 612 to allow server application 612 to authenticate the mobile station 602, 606 as outlined herein. Upon successful authentication, the server 612 informs the server application 610, which in turn provides access to the resource via data communication through the various communication elements (e.g. 614, 608 and 604) of the network 600.

As shown by the above discussion, functions relating to voice and data communication may be implemented on computers connected for data communication via the components of a packet data network, as shown in FIG. 6. Although special purpose devices may be used, such devices also may be implemented using one or more hardware platforms intended to represent a general class of data processing device commonly used to run "server" programming so as to implement the functions discussed above, albeit with an appropriate network connection for data communication.

Figure 7:
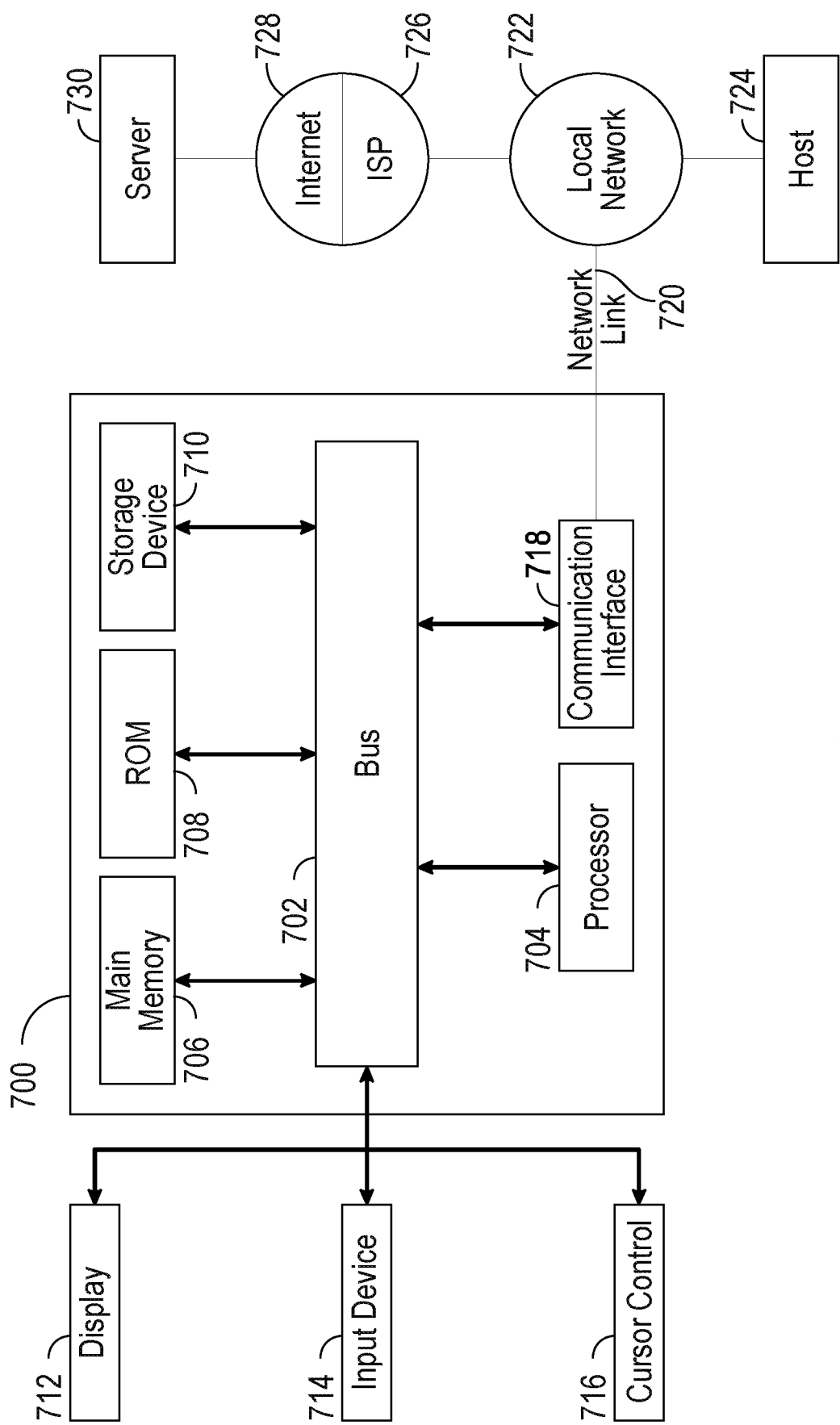
FIG. 7 is a block diagram that illustrates a computer system upon which aspects of this disclosure may be implemented, according to one more aspects of this disclosure.

FIG. 7 is a block diagram illustrating aspects of a computer system 700 upon which aspects of this disclosure may be implemented, including but not limited to the processes according to this disclosure of initiating, accepting, using, and/or terminating an account to account access management relationship, such as described in reference to FIGS. 2-5. For example, a mobile station which is used to perform one or more aspects of this disclosure may implement functional blocks, defined and arranged with one another according to the illustrated computer system 700.

Computer system 700 may include a bus 702 or other communication mechanism for communicating information, and a processor 704 coupled with bus 702, and configured to execute computer-executable instructions stored, for example, in a main memory 706. The main memory 706 can be implemented in, and distributed across various system memory resources accessible through the bus 702, including random access memory (RAM) or other types of dynamic storage device. Main memory 706 may be used for storing temporary variables or other intermediate information during execution of instructions by processor 704. Computer system 700 can also include a read only memory (ROM) 708 or other static storage device, and a storage device 710, such as a magnetic disk or optical disk, each coupled to bus 702 for storing static information and instructions for processor 704.

Computer system 700 may be coupled via bus 702 to a display 712, such as a liquid crystal display (LCD), for displaying information to a computer user. An input device 714, including alphanumeric and other keys, or a touchscreen (not separately visible in FIG. 7) can be coupled to bus 702 for communicating information and command selections to processor 704.

Processor 704 can be configured to execute one or more sequences of one or more instructions contained in main memory 706. Such instructions may be read into main memory 706 from another machine-readable medium, such as storage device 710. Execution of the sequences of instructions contained in main memory 706 causes processor 704 to perform at least some of the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 700, various machine-readable media are involved, for example, in providing instructions to processor 704 for execution. Such media can have various forms, including but not limited to, non-volatile media, volatile media, and transmission media. Non-volatile media can include, for example, optical or magnetic disks. Volatile media can include dynamic memory. Transmission media can include coaxial cables, copper wire and optical fiber, including conductors that implement bus 702. Transmission media can also take the form of acoustic or light waves, such as those generated during radio wave and infrared data communications. All such media must be tangible to enable the instructions carried by the media to be detected by a physical mechanism that reads the instructions into a machine. A cursor control 716, such as a mouse, a trackball, or cursor direction keys, can be included for communicating direction information and command selections to processor 704 and for controlling cursor movement on display 712. The cursor control 716 can provide two degrees of freedom in two axes, a first axis (e.g., x) and a second axis (e.g., y), that allows the device to specify positions in a plane.

Computer system 700 can include a communication interface 718 coupled to bus 702, to provide a two-way data communication coupling through a network link (visible, but not separately numbered) to a local network 722. Network link 720 can provide data communication through one or more networks to other data devices. Network link 720 may provide connection through local network 722 to a host computer 724 or to data equipment operated by an Internet Service Provider (ISP) 726 to access the "Internet" 728, and a server resource 730. Computer system 700 can send messages and receive data, including program code, through the network(s), network link 720 and communication interface 718. The received code can be executed by processor 704 as it is received, and/or stored in storage device 710, or other non-volatile storage for later execution. Computer system 700 may obtain such code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method comprising:
   receiving a request from a first user to perform at least one of accessing a resource or performing a task on the resource, the first user being associated with a first user account;
   upon receiving the request from the first user, determining if the first user has permission to access the resource or perform the task on the resource by examining an attribute of a delegate associated with the first user account;
   upon determining that the first user account has permission to access the resource or perform the task on the resource, creating a connection between the delegate and the resource; and
   performing the at least one of accessing the resource or performing the task on the resource via the connection, wherein:
      the delegate is a resource access arrangement established between the first user account and a second user account associated with a second user, and
      the first user account is a borrower account and the second user account is an owner account, the owner account being associated with the resource and enabling the first user account to access the resource.

2. The method of claim 1, wherein the attribute includes at least one of a schedule, target, condition or scope.

3. The method of claim 2, wherein the scope defines one or more tasks the first user is permitted to perform on the resource.

4. The method of claim 3, wherein the one or more tasks include read, read-only, read-write, write, and write-only.

5. The method of claim 1, wherein the delegate includes a scope modifier for the attribute.

6. The method of claim 5, wherein the scope modifier includes at least one of a post operation, a put operation, a patch operation, a delete operation or a specifically defined action.

7. The method of claim 6, wherein the scope modifier is applied to write or write-only scope definitions.

8. A system comprising:
a processor;
a wireless communication module communicatively coupled to the processor; and
a memory, communicatively coupled to the processor on which are stored instructions that when executed cause the processor to:
receive a request from a first user to perform at least one of accessing a resource or performing a task on the resource, the first user being associated with a first user account;
upon receiving the request from the first user, determine if the first user has permission to access the resource or perform the task on the resource by examining an attribute of a delegate associated with the first user account;
upon determining that the first user account has permission to access the resource or perform the task on the resource, create a connection between the delegate and the resource; an
perform the at least one of accessing the resource or performing the task on the resource via the connection,
wherein:
the delegate is a resource access arrangement established between the first user account and a second user account associated with a second user, and
the first user account is a borrower account and the second user account is an owner account, the owner account being associated with the resource and enabling the first user account to access the resource.

9. The system of claim 8, wherein the attribute includes at least one of a schedule, target, condition or scope.

10. The system of claim 9, wherein the scope defines one or more tasks the first user is permitted to perform on the resource.

11. The system of claim 10, wherein the one or more tasks include read, read-only, read-write, write, and write-only.

12. The system of claim 8, wherein the delegate includes a scope modifier for the attribute.

13. The system of claim 12, wherein the scope modifier includes at least one of a post operation, a put operation, a patch operation, a delete operation or a specifically defined operation.

14. The method of claim 12, wherein the scope modifier is applied to at least one of write or write-only scope definitions.

15. At least one non-transitory computer readable medium on which are stored instructions comprising instructions that when executed cause a programmable device to:
receive a request from a first user to perform at least one of accessing a resource or performing a task on the resource, the first user being associated with a first user account;
upon receiving the request from the first user, determine if the first user has permission to access the resource or perform the task on the resource by examining an attribute of a delegate associated with the first user account;
upon determining that the first user account has permission to access the resource or perform the task on the resource, create a connection between the delegate and the resource; and
performing the at least one of accessing the resource or performing the task on the resource via the connection,
wherein:
the delegate is a resource access arrangement established between the first user account and a second user account associated with a second user, and
the first user account is a borrower account and the second user account is an owner account, the owner account being associated with the resource and enabling the first user account to access the resource.

16. The non-transitory computer readable medium of claim 15, wherein the attribute includes at least one of a schedule, target, condition or scope.

17. The non-transitory computer readable medium of claim 15, wherein a scope definition is used to define a type of access available to the delegate for the attribute.

18. The non-transitory computer readable medium of claim 17, wherein the attribute includes at least one of place, schedule, tag, target and trigger.

19. The non-transitory computer readable medium of claim 17, wherein the scope definition includes a scope modifier, the scope modifier defining at least one of restrictions or allowable operations.

* * * * *